June 25, 1968    G. B. WILLIAMS    3,389,604

TEMPERATURE SENSING DEVICE

Filed Nov. 5, 1965

INVENTOR
GEORGE BRAZIL WILLIAMS
BY Nolte & Nolte
ATTORNEYS

United States Patent Office 3,389,604
Patented June 25, 1968

3,389,604
TEMPERATURE SENSING DEVICE
George B. Williams, New Bedford, Mass., assignor to Buzzards Corporation, Marion, Mass., a corporation of Massachusetts
Filed Nov. 5, 1965, Ser. No. 506,489
2 Claims. (Cl. 73—362)

This invention relates to an improved coating for thermistors and/or similar components.

Thermistors are widely used in the measurement field to give indications of temperature. One use for thermistors, which has become widespread, is the submersion of a thermistor, within a probe, into sea water to provide temperature indications of the water. Serious problems, however, occur when a thermistor is used in a sea water environment. One such problem is the occurrence of electrical breakdown or complete electrical shorting of the thermistor, causing current leakage between the thermistor and the sea water medium which produces erroneous temperature indications. Similarly the thermistor is subject to a pressure which is proportional to the depth to which it is submerged.

To overcome the danger of leakage and voltage breakdown, an insulating coating is placed about the thermistor, so that the thermistor may be used in a sea water environment without the danger of leakage between the thermistor and the water, or the danger of voltage breakdown of the insulation. To be effective, the coating should have the properties of providing infinite resistance between the thermistor and the water; the breakdown voltage of the insulation, produced by the coating, should be higher than that expected in ordinary operation of the thermistor. It is also desirable that the coating be relatively thin so that the thermistor, within a short time, is responsive to the ambient temperature.

Another difficulty resulting from presently known methods of coating is present in the coating of objects having sharp corners or edges, such as thermistors. The coating material tends to form along the smooth surfaces, but does not form at the sharp edges or corners.

In a thermistor, the absence of coating at the corners might well cause a breakdown of the insulation and a voltage discharge between the thermistor body and the sea. Other known coating methods produce an excess of coating materials at the corners, which produces a variation on the response of the thermistor when the thermistor changes its orientation within the medium. It is, therefore, highly advantageous to provide a coating which is uniform over the entire surface of the thermistor.

Various coating materials have been applied to thermistors each of which exhibit some of the desired functions but none of these has so far been found to provide for complete insulation from the sea water, a high breakdown voltage, ability to withstand high pressure, and a good time constant response.

According to the invention, a method has been found by which a superior coating can be placed upon a thermistor to satisfy all these requirements. The coating so produced provides long lasting, insulating protection at relatively low coating costs. This method also provides for a uniformity of coating whereby large numbers of thermistors can be coated with great reliability of operation.

The method relies upon coating a thermistor with a coating of a thermoplastic polymer, of the xylylene series. The polymer is formed when a xylylene monomer vapor is condensed upon the surface of the thermistor, to form a polymer coating on the thermistor.

Further objects and features of this invention may be had from the specification below and the drawing in which.

Figure 1:
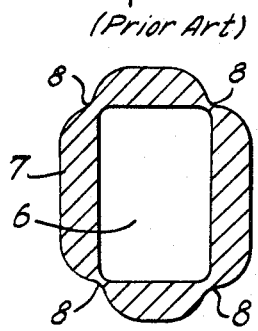
FIG. 1 is a cross-sectional view of a coated thermistor illustrating the deficiencies in the prior art.
Figure 2:
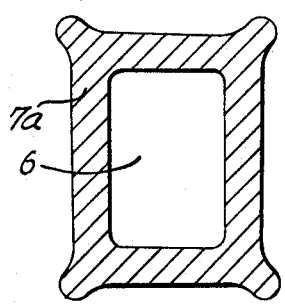
FIG. 2 is another view of a faulty coating of a thermistor obtained by use of the known coating methods.

The deficiencies in the previously known coating methods is best shown by a reference to FIGS. 1 and 2. A thermistor 6 is shown with an insulating coating 7. As shown in the FIG. 1 the coating is thickest on the flat surfaces of the thermistor body but is substantially thinner at the corner portions 8 of the thermistor 6. The lack of insulation at these corner portions creates serious problems of insulation breakdown. Other known coating methods produce the coating as shown in FIG. 2 in which the coating 7a forms an excessive thickness at the corners relative to the coating thickness over the remainder of the thermistor 6. A thermistor coated in this manner will produce varying results as the thermistor shifts its position within the medium in which it is disposed. The readings obtained thereby would be erroneous and/or unreliable.

Figure 3:
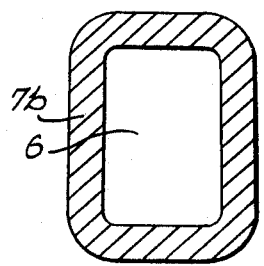
FIG. 3 is a cross-sectional view of the thermistor coated according to a process according to this invention.

According to the inventive process described below, a coating 7b, as shown in FIG. 3 is placed on the thermistor body having a uniform thickness over the entire surface thereof. No discontinuity nor excessive buildup of the insulation is present so that a superior insulating coating is provided to provide reliable and breakdown-free operation of the thermistor. The insulation coating, as shown in FIG. 3 is of equal thickness at the corner or curved portions of the thermistor body as it is at the level or even portions of the thermistor body. In this manner, the temperature gradient between the test medium and thermistor is constant at each point along the thermistor.

Figure 4:
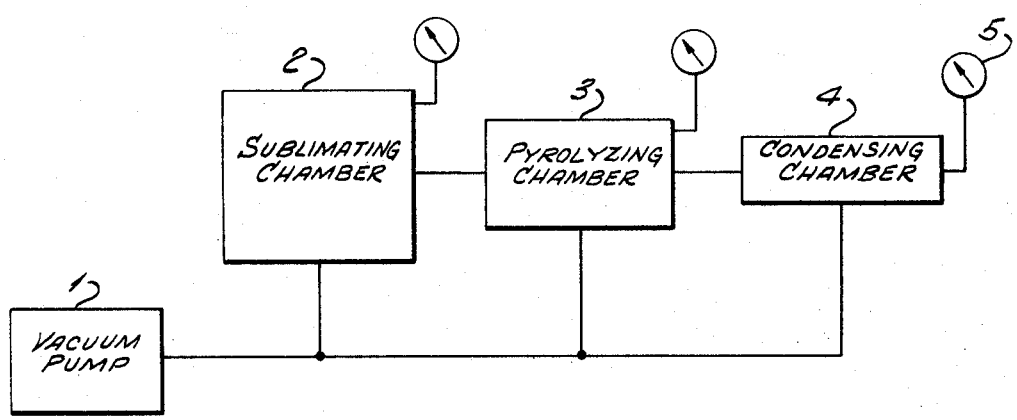
FIG. 4 is a block diagram, illustrating the various steps in the coating process.

The method by which the thermistor is to be coated with the coating material can be best understood by a reference to the FIG. 4 which shows a block diagram of the coating process. The coating material, poly-para-xylylene is a chain polymer which is formed when para-xylylene monomer vapor condenses on the cold surface of the thermistor. The reaction of the vapor monomer upon the cold thermistor surface triggers a chemical switch in the binding forces resulting in a formation of a chain polymer on the cold surface of the thermistor.

Di-p-xylylene which is the starting material for the coating process, is placed within the sublimation chamber 2 in which the pressure is reduced to approximately 5 mm. of mercury, by the operation of vacuum pump 1. The temperature of the sublimation chamber 2 is elevated to approximately 200° C. so that the vapor phase of di-para-xylylene is produced. This vapor phase is pyrolyzed within pyrolyzing chamber 3 at a reduced pressure of approximately 5 mm. mercury and at 550° C. to form para-xylylene which is an unstable monomer. This vapor then enters condensing chamber 4 in which the pressure is reduced by the vacuum pump 5 mm. of mercury. The temperature is reduced within the condensation chamber to below 50° C. The thermistor is placed within the sublimation chamber, where the para-xylylene vapor condenses on the cool body of the thermistor whereupon the cooling action triggers a chemical switch in the vapor to produce a coating on the thermistor of a polymer of poly-p-xylylene.

The three chambers may be constructed to constitute three separate sections of one overall chamber. A pressure gauge 5 is provided at each chamber to give an accurate indication of the pressure within the chamber.

It has been found that the coating process will be more uniform if the thermistor is rotated, preferably in the horizontal plane, within the condensing chamber.

It is found that a complete cycle to deposit of .001 inch of material on the thermistor is roughly 20 minutes, of which ten minutes is required to evacuate the chamber, five minutes to bring the respective units up to the required temperatures, and five minutes for the vapor deposition process.

Means for entering the sublimation chamber and the condensing chamber are provided so that the di-para-xylylene and the thermistor work piece can be inserted into the proper chamber.

What is obtained by this coating process is a thin, uniform coating, which exhibits excellent resistance to high temperature, solvents, and excellent thermal stability, ductility, and dielectric properties. Moreover, the coating over the corners and unever portions of the thermistor is of the same thickness and quality as that over the even surfaces of the thermistor.

From the foregoing description it is apparent that a method is provided for applying a uniform coating over components and particularly transducers subject to extreme environmental conditions.

What I claim is:

1. A device for sensing the temperature of a medium comprising; a body portion having corners, accurate surfaces and discontinuities thereover, and a coating of poly-para-xylylene deposited over said body, said coating being of equal thickness at each portion of said body and extending over the entire surface thereof, said coating also being of sufficient thickness to electrically insulate said device from said medium and to maintain substantial thermal continuity therebetween.

2. The device as recited in claim 1 wherein said coating has a thickness of approximately .001 inch.

References Cited

UNITED STATES PATENTS

| | | | |
|---|---|---|---|
| 3,153,769 | 10/1964 | Moses | 73—362 X |
| 3,214,719 | 10/1965 | Turner | 338—22 |

DAVID SCHONBERG, *Primary Examiner.*

J. W. ROSKOS, *Assistant Examiner.*